March 6, 1951 — T. P. HUDEN — 2,544,596
CARGO HOOK
Filed Sept. 20, 1947
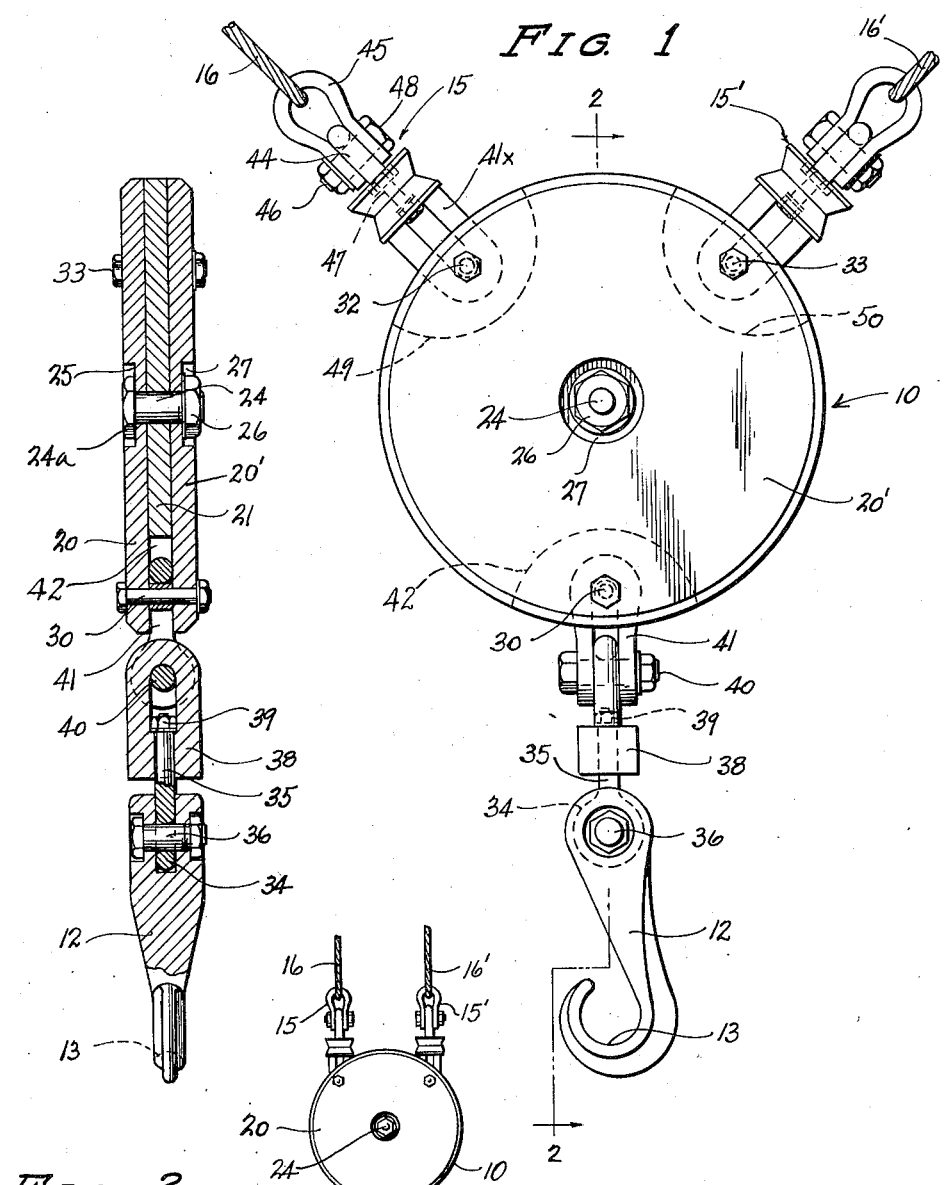
INVENTOR.
THOMAS P. HUDEN
BY Cook & Robinson
ATTORNEYS Patented Mar. 6, 1951

2,544,596

UNITED STATES PATENT OFFICE 2,544,596

CARGO HOOK

Thomas P. Huden, Seattle, Wash.

Application September 20, 1947, Serial No. 775,172

1 Claim. (Cl. 294—78)

This invention relates to improvements in devices which are commonly known in the art to which they belong as "cargo hooks" and it has reference more particularly to cargo hooks used in connection with the gear and winch lines of ships as used for the loading and unloading of cargo and which hooks are adapted to be slung by cables, referred to as the main runners, from crane booms and to be lowered into and raised from ships' holds through hatchways; it being the principal object of the present invention to provide a cargo hook of the above stated kind that is non-fouling; that does not turn in use in such manner as to cause twisting together of the runners; that permits that free unwinding or turning of the strands of the main runners that is incident to variation in the amount of strain or pull that is placed thereon, and which is especially strong and durable yet of simplified and relatively inexpensive construction.

Other objects of the invention reside in the details of construction of the various parts of the device, in the combination of these parts and in the mode of use of the device, as will hereinafter be fully described.

In accomplishing the above mentioned and other objects of the invention, I have provided the improved details of construction, the preferred forms of which are illustrated in the accompanying drawings, wherein—

Fig. 1 is a side view of a cargo hook embodied by the present invention, showing the suspending shackles in diverging relationship.

Fig. 2 is a section of the hook as seen on the line 2—2 in Fig. 1.

Fig. 3 is a side view of the device in reduced scale, showing the swivel shackles as moved to parallel relationship.

Referring more in detail to the drawings—

In its present preferred form of construction, the device of my invention comprises a main block, or body portion, designated in its entirety by reference numeral 10, from the lower part of which a hook 12 depends. This hook, which is attached to the body by means presently described, is formed with a hook seat 13 to which the attaching ropes 14 of a cargo sling, or the like, may be easily applied as shown in Fig. 3. Pivotally attached to the upper portion of the body 10, at opposite sides of a vertical center line, are swivel shackles 15 and 15' by which connection is made between the block 10 and the hoisting cables or main runners 16 and 16' used in connection with cable winding devices or winches, as is well understood in the art.

The main body portion 10 of the device is of circular form. It comprises a pair of opposite side disks, 20 and 20', of suitable metal, circular in form and of the same diameter. These disks are vertically disposed and secured concentrically of and flatly against the opposite sides of an intermediate spacer disk 21 of the same diameter.

The means for the securement of the disks together comprises a center bolt 24 that is extended through all three disks, as shown in Fig. 2, and which has a head portion 24a at one end set down within a recess 25 in the outer face of the disk 20 and has a nut 26 threaded onto its other end and set down within a similar recess 27 in the disk 20'.

In addition to the center bolt 24, the disks 20 and 20' are secured by a bolt 30 that is extended through the disks 20 and 20' near the lower edge of the block body for the attachment of the hook 12 thereto, and near the top edge of the block, equally spaced at opposite sides of the vertical center, bolts 32 and 33 are extended through the disks for the attachment thereto of the shackles 15 and 15'.

The hook 12, as shown best in Fig. 2, is pivotally attached at its upper end to an eyelet 34 at the lower end of a swivel bolt 35, the connection being made by a horizontal bolt 36. The swivel bolt 35 extends vertically through and is rotatably secured within the base of a swivel 38 by means of a nut 39 threaded onto its upper end. The swivel 38 is attached by means of a horizontal bolt 40 to a clevis 41, which in turn is suspended from between the plates 20 and 20' by its application over the bolt 30. The hook 12, as thus suspended, can swing on the supporting bolt 30 in the plane of the body disk, and it can rotate about the axis of the bolt 35 and can also pivot on the horizontal bolt 36.

It is to be observed in Figs. 1 and 2, that the intermediate disk 21 of the body assembly 10, is recessed as at 42 about the bolt 30 so that the clevis 41 cannot swing laterally but may swing freely on the bolt to opposite sides with respect to its showing in Fig. 1 without placing any undue strain thereon.

Each of the swivel shackles 15 and 15' whereby the body 10 is connected with the lines or runners 16 and 16' extended from the booms, not shown, comprises an inner end link 41X of U-shape that is applied about the attaching bolt 32 or 33, and a similarly shaped outer end link 44 to which a clevis 45 is attached by a bolt 46. The links 44 and 45 of each swivel are joined by a swivel bolt 48. It is also to be observed in Fig. 1 that the center disk 21 is recessed, as at 49 and 50, about the bolts 32 and 33, to give ample space between the opposite face disks 20 and 20' to receive the links 41x of the shackles. These two swivel shackles are thus permitted to swing freely about their attaching bolts 32—33 in the vertical plane of the body disk and may move toward and from each other to accommodate the change in angular divergence or convergence of the supporting runners 16 and 16'. Also, either swivel automatically accommodates itself to the winding or unwinding of the runner under the strain imposed upon it. Thus, there is no tendency, due to the strain on the runners, to cause the block to rotate or turn in use and cause tangling of the cables 16—16'.

While I have described specifically the means of connecting the hook 12 with the body and have also described certain details of construction of the swivel shackles, it is to be understood that any standard construction might be employed in their stead, so long as the hook and the shackles have the swiveling action of those herein shown.

Blocks of this type may be made in various sizes and of various materials. Preferably the disks which make up the body would each be of steel from one-half to one inch thick, and the peripheral edges of the outside disks would be beveled, as shown, to eliminate as much as possible any chance of the block hanging up on hatch edges.

Cargo hooks of this type have proven to be very efficient, effective and desirable, due to the non-fouling action and the simplicity of construction which eliminates the undesirable features found in blocks now generally in use.

Having thus described my invention, what I claim as new therein and desire to secure by Letters Patent is:

A cargo handling block comprising a pair of parallel, vertically disposed opposite side disks of equal diameter, a spacer disk located between said side disks, means clamping said side disks and spacer disk rigidly together in axial coincidence and contained entirely between the outer surfaces of the opposite side disks, a pair of pivot bolts extended through the paired disks near their top edges, at opposite sides and at equal distances from the vertical center line of the block, a swivel shackle secured by each bolt between the side disks and extended upwardly therefrom, means secured to the outer ends of said swivel shackles for their attachment to hoisting lines; said shackles being adapted to pivot on their securing bolts only in the plane of the spacer disk and the said hoisting line attaching means being adapted to swing independently in any direction, a pivot bolt extended through the lower edges of the side disks in the vertical center line of the block, a clevis suspended on the bolt from between the opposite side disks, and adapted to swing on its suspending bolt in the plane of the spacer disk a swivel suspended by the said clevis to swing laterally of the plane of the block and a cargo hook suspended by the swivel.

THOMAS P. HUDEN.

REFERENCES CITED

The following references are of record in the file of this patent:

UNITED STATES PATENTS

| Number | Name | Date |
|---|---|---|
| 1,567,719 | Erlandsen | Dec. 29, 1925 |
| 2,139,294 | Weigant | Dec. 6, 1938 |
| 2,346,277 | Sherman | Apr. 11, 1944 |
| 2,371,009 | Wirkkala | Mar. 6, 1945 |